(12) United States Patent
Zhang

(10) Patent No.: US 10,743,543 B2
(45) Date of Patent: Aug. 18, 2020

(54) BOTANICAL DISINFECTION COMPOSITION, DISINFECTANT AND PREPARATION METHOD THEREOF

(71) Applicant: Shuqing Zhang, Nanjing (CN)

(72) Inventor: Shuqing Zhang, Nanjing (CN)

( * ) Notice: Subject to any disclaimer, the term of this patent is extended or adjusted under 35 U.S.C. 154(b) by 414 days.

(21) Appl. No.: 15/833,198

(22) Filed: Dec. 6, 2017

(65) Prior Publication Data

US 2018/0153176 A1 Jun. 7, 2018

(30) Foreign Application Priority Data

Dec. 7, 2016 (CN) .......................... 2016 1 1116734

(51) Int. Cl.
| | |
|---|---|
| *A01N 65/00* | (2009.01) |
| *A01N 37/44* | (2006.01) |
| *A01N 31/02* | (2006.01) |
| *A01N 37/04* | (2006.01) |
| *A01N 35/02* | (2006.01) |
| *A01N 65/44* | (2009.01) |
| *A01N 65/22* | (2009.01) |
| *A01N 65/28* | (2009.01) |

(52) U.S. Cl.
CPC ............ *A01N 65/00* (2013.01); *A01N 31/02* (2013.01); *A01N 35/02* (2013.01); *A01N 37/04* (2013.01); *A01N 37/44* (2013.01); *A01N 65/22* (2013.01); *A01N 65/28* (2013.01); *A01N 65/44* (2013.01)

(58) Field of Classification Search
None
See application file for complete search history.

(56) References Cited

U.S. PATENT DOCUMENTS

| | | |
|---|---|---|
| 2007/0197418 A1 | 8/2007 | Rahse |
| 2018/0153176 A1 | 6/2018 | Zhang |

FOREIGN PATENT DOCUMENTS

| | | |
|---|---|---|
| CN | 101861883 A | 10/2010 |
| CN | 101884801 A | 11/2010 |
| CN | 101991521 A | 3/2011 |
| CN | 102239893 A | 11/2011 |
| CN | 103749563 A | 4/2014 |
| CN | 105112180 A | 12/2015 |
| CN | 106665700 A | 5/2017 |
| EP | 3332643 A1 | 6/2018 |
| JP | 2007524743 A | 8/2007 |
| JP | 2012232970 A | 11/2012 |
| WO | 2013103944 A1 | 7/2013 |

OTHER PUBLICATIONS

Zhan-guo, et al., Adv. Mat. Res., 183-5:920. (Year: 2013).*
Leeming, et al., British Journal of Dermatology, 115:551. (Year: 1986).*
Bassole, et al., Molecules, 17:3989. (Year: 2012).*
Official Action of the Chinese Patent Office dated Sep. 10, 2018 in Chinese Patent Application No. 201611116734.1, 10pgs.
Official Action of the Japanese Patent Office dated Oct. 25, 2018 in Japanese Patent Application No. 2017-234673, 6pgs.
Qi, Yuanchang, "Development and Utilization of Natural Medicine Resources," Jiangsu Science and Technology Press, Dec. 2000, pp. 26-27.
Vican, Pierre, "The Benefits of Essential Oils," Lijiang Publishing House, May 2012, pp. 187-189.
von Braunschweig, Ruth, "The Complete Guide to Essential Oils," Shantou University Press, Jul. 2006, pp. 108.
Yu, Xiulu, "New Handbook for Topical Antibiotics," Shandong Science & Technology Press, Sep. 1996, pp. 106-107.
Communication pursuant to Article 94(3) EPC dated Mar. 13, 2019 for EP Application No. 17205722.6, 8 pages.
Communication pursuant to Article 94(3) EPC dated Sep. 11, 2019 for EP Application No. 17205722.6, 7 pages.
Official Action of the Chinese Patent Office dated Apr. 9, 2019 in Chinese Patent Application No. 201611116734.1, Translation included, 5 pages.
Refusal Decision Official Action of the Chinese Patent Office dated Sep. 18, 2019 in Chinese Patent Application No. 201611116734.1, Translation included, 8 pages.
Carson et al., "*Melaleuca alternifolia* (Tea Tree) Oil: A Review of Antimicrobial and Other Medicinal Properties," Clin Microbiol Rev., 19(1):50-62, Jan. 2006.
Cox et al., "The Mode of Antimicrobial Action of the Essential Oil of *Melaleuca alternifolia* (Tea Tree Oil)," J Appl Microbiol., 88(1):170-175, Jan. 2000.
Examination Report of IP Australia dated Jun. 28, 2018 in AU Application No. 2017272158; 4pgs.
Examination Report of the European Patent Office dated Jun. 4, 2018 in EP Application No. 17205722.6 (EP3332643A1); 8pgs.
Gustafson et al., "Effects of Tea Tree Oil on *Escherichia coli*," Lett Appl Microbiol., 26(3):194-198, Mar. 1998.
Hammer et al., "Antimicrobial Activity of Essential Oils and Other Plant Extracts," J Appl Microbiol., 86(6):985-990, Jun. 1999.

(Continued)

*Primary Examiner* — Michael Barker
(74) *Attorney, Agent, or Firm* — Haukaas Fortius PLLC; Michael H. Haukaas

(57) ABSTRACT

The invention relates to the field of disinfectants, in particular to a botanical disinfection composition. The botanical disinfection composition comprises the following raw materials in parts by weight: 0.5-1.0 part of tea tree essential oil, 0.5-1.0 part of niaouli essential oil, 0.5-1.0 part of palmarosa essential oil, 0.5-1.0 part of lemon mint essential oil, and 0.3-0.8 part of lemon myrtle essential oil and/or litsea cubeba essential oil. The invention further provides a method for preparing the botanical disinfection composition, comprising uniformly mixing tea tree essential oil, niaouli essential oil, palmarosa essential oil, lemon mint essential oil, and lemon myrtle essential oil and/or litsea cubeba essential oil according to predetermined parts by weight. The botanical disinfection composition provided by the invention is low in usage amount of ethanol, small in toxic and side effects, good in sterilization effect and short in action time.

7 Claims, No Drawings

(56) References Cited

OTHER PUBLICATIONS

Hayes et al., "Toxicity of Australian Essential Oil *Backhousia citriodora* (Lemon Myrtle). Part 2. Absorption and Histopathology Following Application to Human Skin," Food Chem Toxicol., 41(10):1409-1416, Oct. 2003.
Maple et al., "Comparison of the In-Vitro Activities of the Topical Antimicrobials Azelaic Acid, Nitrofurazone, Silver Sulphadiazine and Mupirocin Against Methicillin-Resistant *Staphylococcus aureus*," J Antimicrob Chemother., 29 (6):661-668, Jun. 1992.
Tahira et al., "Major Phenolic Acids of Local and Exotic Mint Germplasm Grown in Islamabad," Pak. J. Bot., 43 (Special Issue):151-154, Dec. 2011.
Wang et al., "Chemical Composition and Antibacterial Activity of Essential Oils from Different Parts of Litsea cubeba," Chem Biodivers., 7(1):229-235, Jan. 2010.
Wilson et al., "Rapid Evaluation of Plant Extracts and Essential Oils for Antifungal Activity Against Botrytis cinerea," Plant Disease, 81(2):204-210, Feb. 1997.

\* cited by examiner

US 10,743,543 B2

BOTANICAL DISINFECTION COMPOSITION, DISINFECTANT AND PREPARATION METHOD THEREOF

RELATED APPLICATIONS

This application claims priority under 35 U.S.C. § 119 and 37 CFR 1.55 to Chinese Patent Application No. 201611116734.1, filed Dec. 7, 2016, which is incorporated herein by reference.

TECHNICAL FIELD

The present invention relates to the field of disinfectants, in particular to a botanical disinfection composition, disinfectant and preparation method thereof.

BACKGROUND

Materials used for botanical disinfection products are mainly substances having antimicrobial activities of organic compounds contained in secondary metabolites, such as terpenoids, alkaloids and phenolic compounds. Such compounds are secondary metabolites produced through self adjustment and self protection during long-term evolution under adaptive environment. It is generically recognized that such compounds can be used for disinfection and sterilization. Compared with conventional chemical synthetic disinfectants, the compounds especially have the advantages that various compounds contained in the botanical disinfectant can act on pathogenic microorganisms in a multi-target manner, and drug resistance is not liable to cause as compared with conventional chemical synthetic disinfectants; the compounds are completely biodegradable and are environmentally-friendly and safe; botanical materials are renewable resources, and completely meet the sustainable development requirements of human beings; the selected botanical sterilization materials can have strong target selectivity and are safe and harmless to non-target organisms; and botanical sterilization and disinfection products are generally mild in effect and less in irritability, and almost have no toxicity and side effect within dosage.

At present, domestic research and development on botanical antibacterial materials are generally concentrated on antibacterial and bacteriostatic actions, and particularly many research achievements in the respects of the antibacterial and bacteriostatic actions are achieved. However, no research that actually achieves the disinfection effect is obtained. Antibacterial & bacteriostatic actions and disinfection are two different concepts. Disinfection is a normative concept with specific connotation and refers to killing or removing pathogenic microorganisms from propagation media to the extent of harmlessness. The disinfection efficacy of the disinfection products needs to be certified through inspection of Technical Standard for Disinfection (2002). Although fruitful research results are achieved on botanical antibacterial materials in the field of pesticides application, research achievements are not in the same application field as sterilization and disinfection products for humans.

In general, three research and development ways exist for conventional botanical disinfection products for sterilization and disinfection: finished products made by using plant (or Chinese herbal medicine) crude extracts as the raw material; finished products made by using plant refine extracts, namely plant essential oil as the raw materials; and finished products made by using single plant extracts as the raw material. The botanical antibacterial materials having certain disinfection efficacy have provided some preliminary achievements. A precedent of a composition compounding Chinese herbal medicine crude extracts is used as an example: Chinese patent document (CN101861883A) discloses a botanical disinfectant and a preparation method thereof, the botanical disinfectant comprising the following raw materials in percentage by weight: 1-10% of fructus forsythiae, 5-20% of honeysuckles, 25-45% of licorice roots, 5-15% of rhizoma coptidis, 5-15% of cortex phellodendri, 1-10% of radix et rhizoma rhei, 1-10% of safflowers, 1-10% of cloves, 1-10% of radix paeoniae rubra and 1-10% of fineleaf schizonepeta herbs, and crushed materials are soaked in baijiu for 5-10 days. Such kind of composition is characterized in that the content of ethanol is nearly 50%, and is expressed as 49% or below (50% ethanol already has the ability of killing bacteria); and as shown in test reports, fetal bovine serum used in interferents is only 0.3%, indicating that the compound can only be used for secondary disinfection even in compliance with relevant regulations in the Technical Standards for Disinfection, having little significance in practical use. A precedent of a composition compounding essential oils as a disinfectant is used as an example: Chinese patent document (CN102239893A) discloses a bactericidal disinfectant made of plant essential oils, which is prepared from the following raw materials in percentage by weight: 0.3% of eucalyptus oil, 0.4% of tea tree oil, 0.3% of armoise oil, 0.5% of rosemary oil, 0.5% of bergamot oil, 0.5% of lemon oil, 0.7% of lavender oil, 0.2% of clove oil, 0.4% of thyme oil and the balance of a diluent. In the composition disclosed by the invention, essential oil accounts for 3.8% and the balance is the diluent. The ethanol is usually used as a diluent of essential oils, and such a high proportion of ethanol makes the composition insignificant in practical promotion. In addition, Chinese patent document (CN103749563A) discloses a composition disinfectant of plant essential oils, which comprises the following components in percentage by weight: 1% of peppermint oil, 0.5% of bay essential oil, 1.5% of eucalyptus essential oil, 1% of tangerine peel essential oil, 1% of juglandiphyllum essential oil, 3% of citric acid and the balanced of ethanol. The same as the previous example, the ethanol content of the compound is up to 90% or above. Due to high ethanol content of the two patent application compositions, it is impossible to determine the disinfection effect of essential oil components.

The botanical disinfectants described in the patent applications have the following characteristics:

1. the preparation technology is simple and rough, for example, only essential oils and ethanol are used;
2. a substantial amount of organic diluents is used, so that the making cost is high, and practical use value does not exist;
3. the products are not effective in functions, the problem that the functions of main functional materials in the compounds are even not clear, exists, and obvious defects existing in the technology; and
4. the property advantages of botanical disinfection products fail cannot be shown due to heavy use of diluents (ethanol).

SUMMARY

Therefore, a technical problem to be solved in the present invention is to overcome the defects existing in the prior art that ethanol is used in a large amount with low practical use value and poor sterilizing effects while the acting time of disinfectants is long, and the present invention provides a botanical disinfection composition and a botanical disinfectant which are low in usage amount of ethanol, small in toxic and side effects, good in sterilizing effects and short in action time.

Another technical problem to be solved in the present invention is that preparation methods of existing disinfectants are complex and costly and causes serious environment pollution, and the present invention provides simple, low-cost and pollution-free methods for preparing the botanical disinfection composition and the botanical disinfectant.

Therefore, according to one aspect, the present application provides a botanical disinfection composition, comprising the following raw materials in parts by weight:
- 0.5-1.0 part of tea tree essential oil,
- 0.5-1.0 part of niaouli essential oil,
- 0.5-1.0 part of palmarosa essential oil,
- 0.5-1.0 part of lemon mint essential oil, and
- 0.3-0.8 part of lemon myrtle essential oil and/or litsea cubeba essential oil.

Preferably, the botanical disinfection composition comprises the following raw materials in parts by weight:
- 0.8 part of tea tree essential oil,
- 0.5 part of niaouli essential oil,
- 0.5 part of palmarosa essential oil,
- 0.5 part of lemon mint essential oil, and
- 0.5 part of lemon myrtle essential oil and/or litsea cubeba essential oil.

Preferably, the botanical disinfection composition further comprises 0.3-1.0 part of azelaic acid.

Preferably, the botanical disinfection composition further comprises 0.5 part of azelaic acid.

According to another aspect, the present application further provides a botanical disinfectant, comprising the botanical disinfection composition of the present invention, and further comprises 3.4-6.4 parts of Tween 80, 20-30 parts of ethanol, 4-6 parts of 1,2-propanediol, 0.03-0.05 part of ethylenediaminetetraacetic acid (EDTA) disodium salt, and water.

Preferably, the botanical disinfectant comprises the botanical disinfection composition of the present invention, and further comprises 3.5 parts of Tween 80, 30 parts of ethanol, 4 parts of 1,2-propanediol, 0.03 part of EDTA disodium salt, and water.

According to another aspect, the present invention provides a method for preparing the botanical disinfection composition, the method comprising: uniformly mixing tea tree essential oil, niaouli essential oil, palmarosa essential oil, lemon mint essential oil, and lemon myrtle essential oil and/or litsea cubeba essential oil according to predetermined parts by weight. Preferably, the method for preparing the botanical disinfection composition further comprises: mixing azelaic acid with ethanol in a weight ratio of 1:(5-15) to prepare an ethanolic solution of azelaic acid; and mixing the ethanolic solution of azelaic acid with tea tree essential oil, niaouli essential oil, palmarosa essential oil, lemon mint essential oil, and lemon myrtle essential oil and/or litsea cubeba essential oil which are uniformly mixed.

According to another aspect, the present invention provides a method for preparing the botanical disinfectant, comprising:
(1) uniformly mixing tea tree essential oil, niaouli essential oil, palmarosa essential oil, lemon mint essential oil, and lemon myrtle essential oil and/or litsea cubeba essential oil according to predetermined parts by weight to obtain an essential oil mixture;
(2) mixing azelaic acid with ethanol in a weight ratio of 1:(5-15) to prepare an ethanolic solution of azelaic acid;
(3) mixing Tween 80 with 1,2-propanediol to obtain an auxiliary agent;
(4) mixing the essential oil mixture with the auxiliary agent to obtain a first mixture;
(5) adding water into the first mixture and then adding EDTA disodium salt to prepare a second mixture; mixing the ethanolic solution of azelaic acid with the second mixture to obtain a third mixture; and mixing the remaining ethanol with the third mixture to prepare the botanical disinfectant;
or
mixing the remaining ethanol with the first mixture to obtain a second mixture; mixing the ethanolic solution of azelaic acid with the second mixture to obtain a third mixture; and adding water into the third mixture and then adding EDTA disodium salt to prepare the botanical disinfectant.

The technical scheme of the invention has the following advantages.

1. In the botanical disinfection composition provided by the invention, tea tree essential oil, which is famous for its sterilization effect, contains a high proportion of monoterpene alcohol, and monoterpene and terpene oxides thereof, niaouli essential oil contains a high proportion of terpene oxides and corresponding monoterpene, palmarosa essential oil and lemon mint essential oil contain a high proportion of monoterpene alcohol and terpene esters, and both lemon myrtle essential oil and litsea cubeba essential oil contain citral which not only can be used as a perfuming agent to regulate the fragrance of the disinfectant so as to make the disinfectant more acceptable to people but also have antibacterial effect to further improve the antibacterial effect of the disinfectant, making the disinfectant especially effective in killing *Mycobacterium chelonei* subsp. *abscessus* and meet the requirements for disinfection. Monoterpene alcohol, monoterpene aldehyde, terpene oxides and terpene esters all have strong sterilization functions, and are free of toxic and side effects and environmentally-friendly because the raw materials are all extracted from plants, and main components of the essential oils synergistically interact with each other in the composition, so that multi-target bactericidal efficacy is formed, good sterilization effect is achieved, and resistant strains are not liable to generate. In addition, monoterpene contained in essential oils has high cell membrane permeability, so that active components can more quickly act on the objects to be disinfected and the disinfection time is shortened.

2. In the botanical disinfection composition provided by the invention, azelaic acid is also added to the essential oil mixture, and azelaic acid is a botanical product belonging to natural saturated linear dicarboxylic acid of organic acids. Azelaic acid has antibacterial properties with a bactericidal concentration of 1 mol/L. In addition, because of low toxicity, azelaic acid can be used with various active matters to achieve synergism, and azelaic acid has high permeation promoting effects in an emulsion system, and can carry 40-60% of active matters into a cortex. Azelaic acid can rapidly carry bactericidal components in liquor to permeate through outer-layer cell membranes of pathogenic bacteria by the permeation promoting effects to achieve the effect of sterilization, and besides, the sterilization time is shortened.

3. In the botanical disinfectant provided by the invention, an emulgator namely Tween 80, an emulgator additive namely ethanol, and 1,2-propanediol, and EDTA disodium salt are added, so that the prepared disinfectant forms an emulsible system which is stable and has long shelf life. Even the disinfectant is stored for a long term, the sterilization effect of the disinfectant is not influenced. Besides, based on less usage amount of ethanol, the disinfection effect of the essential oil mixture is guaranteed.

4. In the method for preparing the botanical disinfectant provided by the invention, the emulgator, the emulgator additive, deionized water and a synergist are added in order into the plant essential oil mixture, so that the disinfectant is prepared. The preparation technology is simple and reasonable and requirements for production equipment are low, so that production cost of the disinfectant is further reduced.

DETAILED DESCRIPTION

Embodiment 1

A botanical disinfection composition comprises the following raw materials: 0.5 g of tea tree essential oil, 1.0 g of niaouli essential oil, 0.5 g of palmarosa essential oil, 1.0 g of lemon mint essential oil and 0.3 g of lemon myrtle essential oil.

A method for preparing the disinfection composition comprises: 0.5 g of tea tree essential oil, 1.0 g of niaouli essential oil, 0.5 g of palmarosa essential oil, 1.0 g of lemon mint essential oil and 0.3 g of lemon myrtle essential oil are uniformly mixed.

Embodiment 2

A botanical disinfection composition comprises the following raw materials: 1.0 g of tea tree essential oil, 0.5 g of niaouli essential oil, 1.0 g of palmarosa essential oil, 0.5 g of lemon mint essential oil and 0.8 g of litsea cubeba essential oil.

A method for preparing the disinfection composition comprises: 1.0 g of tea tree essential oil, 0.5 g of niaouli essential oil, 0.5 g of palmarosa essential oil, 1.0 g of lemon mint essential oil and 0.8 g of litsea cubeba essential oil are uniformly mixed.

Embodiment 3

A botanical disinfection composition comprises the following raw materials: 0.8 g of tea tree essential oil, 0.5 g of niaouli essential oil, 0.5 g of palmarosa essential oil, 0.5 g of lemon mint essential oil and 0.5 g of lemon myrtle essential oil.

A method for preparing the disinfection composition comprises: 0.8 g of tea tree essential oil, 0.5 g of niaouli essential oil, 0.5 g of palmarosa essential oil, 0.5 g of lemon mint essential oil and 0.5 g of lemon myrtle essential oil are uniformly mixed.

Embodiment 4

A botanical disinfection composition comprises the following raw materials: 0.7 g of tea tree essential oil, 0.8 g of niaouli essential oil, 0.7 g of palmarosa essential oil, 0.8 g of lemon mint essential oil and 0.6 g of litsea cubeba essential oil.

A method for preparing the disinfection composition comprises: 0.7 g of tea tree essential oil, 0.8 g of niaouli essential oil, 0.7 g of palmarosa essential oil, 0.8 g of lemon mint essential oil and 0.6 g of litsea cubeba essential oil are uniformly mixed.

Embodiment 5

A botanical disinfection composition comprises the following raw materials: 1.0 g of tea tree essential oil, 0.5 g of niaouli essential oil, 1.0 g of palmarosa essential oil, 0.5 g of lemon mint essential oil, 0.8 g of lemon myrtle essential oil and 0.3 g of azelaic acid.

A method for preparing the disinfection composition comprises: 1.0 g of tea tree essential oil, 0.5 g of niaouli essential oil, 1.0 g of palmarosa essential oil, 0.5 g of lemon mint essential oil and 0.8 g of lemon myrtle essential oil are uniformly mixed. 0.3 g of azelaic acid is mixed with 3 g of ethanol to prepare an ethanolic solution of azelaic acid; and the ethanolic solution of azelaic acid is mixed with tea tree essential oil, niaouli essential oil, palmarosa essential oil, lemon mint essential oil and lemon myrtle essential oil which are uniformly mixed.

Embodiment 6

A botanical disinfection composition comprises the following raw materials: 0.5 g of tea tree essential oil, 1.0 g of niaouli essential oil, 0.5 g of palmarosa essential oil, 1.0 g of lemon mint essential oil, 0.3 g of litsea cubeba essential oil and 1.0 g of azelaic acid.

A method for preparing the disinfection composition comprises: 0.5 g of tea tree essential oil, 1.0 g of niaouli essential oil, 0.5 g of palmarosa essential oil, 1.0 g of lemon mint essential oil and 0.3 g of litsea cubeba essential oil are uniformly mixed. 1.0 g of azelaic acid is mixed with 10 g of ethanol to prepare an ethanolic solution of azelaic acid; and the ethanolic solution of azelaic acid is mixed with tea tree essential oil, niaouli essential oil, palmarosa essential oil, lemon mint essential oil and litsea cubeba essential oil which are uniformly mixed.

Embodiment 7

A botanical disinfection composition comprises the following raw materials: 0.8 g of tea tree essential oil, 0.5 g of niaouli essential oil, 0.5 g of palmarosa essential oil, 0.5 g of lemon mint essential oil, 0.5 g of lemon myrtle essential oil and 0.5 g of azelaic acid.

A method for preparing the disinfection composition comprises: 0.8 g of tea tree essential oil, 0.5 g of niaouli essential oil, 0.5 g of palmarosa essential oil, 0.5 g of lemon mint essential oil and 0.5 g of lemon myrtle essential oil are uniformly mixed. 0.5 g of azelaic acid is mixed with 5 g of ethanol to prepare an ethanolic solution of azelaic acid; and the ethanolic solution of azelaic acid is mixed with tea tree essential oil, niaouli essential oil, palmarosa essential oil, lemon mint essential oil and lemon myrtle essential oil which are uniformly mixed.

Embodiment 8

A botanical disinfection composition comprises the following raw materials: 0.7 g of tea tree essential oil, 0.8 g of niaouli essential oil, 0.7 g of palmarosa essential oil, 0.8 g of lemon mint essential oil, 0.6 g of litsea cubeba essential oil and 0.7 g of azelaic acid.

A method for preparing the disinfection composition comprises: 0.7 g of tea tree essential oil, 0.8 g of niaouli essential oil, 0.7 g of palmarosa essential oil, 0.8 g of lemon mint essential oil and 0.6 g of litsea cubeba essential oil are uniformly mixed. 0.7 g of azelaic acid is mixed with 7 g of ethanol to prepare an ethanolic solution of azelaic acid; and the ethanolic solution of azelaic acid is mixed with tea tree essential oil, niaouli essential oil, palmarosa essential oil, lemon mint essential oil and litsea cubeba essential oil which are uniformly mixed.

Embodiment 9

A botanical disinfectant comprises the following raw materials: 0.5 g of tea tree essential oil, 1.0 g of niaouli essential oil, 0.5 g of palmarosa essential oil, 1.0 g of lemon mint essential oil, 0.3 g of lemon myrtle essential oil, 1.0 g of azelaic acid, 3.4 g of Tween 80, 30 g of ethanol, 4 g of 1,2-propanediol, 0.05 g of ethylenediaminetetraacetic acid (EDTA) disodium salt and water.

A method for preparing the botanical disinfectant comprises:
(1) 0.5 g of tea tree essential oil, 1.0 g of niaouli essential oil, 0.5 g of palmarosa essential oil, 1.0 g of lemon mint essential oil and 0.3 g of lemon myrtle essential oil are mixed and then uniformly stirred for 20 min to obtain an essential oil mixture, and the essential oil mixture is permitted to stand for later use;
(2) 1.0 g of azelaic acid is mixed with 5.0 g of ethanol to be dissolved to prepare an ethanolic solution of azelaic acid, and the ethanolic solution of azelaic acid is permitted to stand for later use;
(3) 3.4 g of Tween 80 is mixed with 4 g of 1,2-propanediol to obtain an auxiliary agent;
(4) the essential oil mixture is mixed with the auxiliary agent, and stirring is performed for 20 min to obtain a first mixture;
(5) deionized water is slowly added into the first mixture, then 0.05 g of EDTA disodium salt is added, and stirring is performed for 20 min to prepare a second mixture;
(6) the ethanolic solution of azelaic acid is mixed with the second mixture, and stirring is performed for 20 min to obtain a third mixture; and
(7) 25.0 g of remaining ethanol is mixed with the third mixture in a manner that stirring is performed during adding of ethanol until all the ethanol is added, an obtained liquor is permitted to stand when the liquor becomes transparent, the liquor is pumped into a microfilter to be filtered, and filtrate is taken to obtain a finished product, the finished product is subjected to appearance detection and pH value detection and goes to the next procedure if qualified, and the qualified finished product is pumped into a storage tank for later use so as to obtain the botanical disinfectant.

Embodiment 10

A botanical disinfectant comprises the following raw materials: 1.0 g of tea tree essential oil, 0.5 g of niaouli essential oil, 1.0 g of palmarosa essential oil, 0.5 g of lemon mint essential oil, 0.8 g of litsea cubeba essential oil, 0.3 g of azelaic acid, 6.4 g of Tween 80, 20 g of ethanol, 6 g of 1,2-propanediol, 0.03 g of ethylenediaminetetraacetic acid (EDTA) disodium salt and water.

A method for preparing the botanical disinfectant comprises:
(1) 1.0 g of tea tree essential oil, 0.5 g of niaouli essential oil, 1.0 g of palmarosa essential oil, 0.5 g of lemon mint essential oil and 0.8 g of the litsea cubeba essential oil are mixed and then uniformly stirred for 20 min to obtain an essential oil mixture, and the essential oil mixture is permitted to stand for later use;
(2) 0.3 g of azelaic acid is mixed with 4.5 g of ethanol to be dissolved to prepare an ethanolic solution of azelaic acid, and the ethanolic solution of azelaic acid is permitted to stand for later use;
(3) 6.4 g of Tween 80 is mixed with 6 g of 1,2-propanediol to obtain an auxiliary agent;
(4) the essential oil mixture is mixed with the auxiliary agent, and stirring is performed for 20 min to obtain a first mixture;
(5) 15.5 g of remaining ethanol is mixed with the first mixture in a manner that stirring is performed during adding of ethanol until all the ethanol is added to obtain a second mixture;
(6) the ethanolic solution of azelaic acid is mixed with the second mixture, and stirring is performed for 20 min to obtain a third mixture; and
(7) water is slowly added into the third mixture, then 0.03 g of EDTA disodium salt is added, stirring is performed for 20 min, an obtained liquor is permitted to stand, the liquor is pumped into a microfilter to be filtered, and filtrate is taken to obtain a finished product, the finished product is subjected to appearance detection and pH value detection and goes into the next procedure is qualified, and the qualified finished product is pumped into a storage tank for later use so as to obtain the botanical disinfectant.

Embodiment 11

A botanical disinfectant comprises the following raw materials: 0.8 g of tea tree essential oil, 0.5 g of niaouli essential oil, 0.5 g of palmarosa essential oil, 0.5 g of lemon mint essential oil, 0.5 g of lemon myrtle essential oil, 0.5 g of azelaic acid, 3.5 g of Tween 80, 30 g of ethanol, 4 g of 1,2-propanediol, 0.03 g of ethylenediaminetetraacetic acid (EDTA) disodium salt and water.

A method for preparing the botanical disinfectant comprises:
(1) 0.8 g of tea tree essential oil, 0.5 g of niaouli essential oil, 0.5 g of palmarosa essential oil, 0.5 g of lemon mint essential oil and 0.5 g of lemon myrtle essential oil are mixed and then uniformly stirred for 20 min to obtain an essential oil mixture, and then the essential oil mixture is permitted to stand for later use;
(2) 0.5 g of azelaic acid is mixed with 5.0 g of ethanol to be dissolved to prepare an ethanolic solution of azelaic acid, and the ethanolic solution of azelaic acid is permitted to stand for later use;
(3) 3.5 g of Tween 80 is mixed with 4 g of 1,2-propanediol to obtain an auxiliary agent;
(4) the essential oil mixture is mixed with the auxiliary agent, and stirring is performed for 20 min to obtain a first mixture;
(5) deionized water is slowly added into the first mixture, then 0.03 g of EDTA disodium salt is added, and stirring is performed for 20 min to prepare a second mixture;
(6) the ethanolic solution of azelaic acid is mixed with the second mixture, and stirring is performed for 20 min to obtain a third mixture; and
(7) 25.0 g of remaining ethanol is mixed with the third mixture in a manner that stirring is performed during adding of ethanol until all the ethanol is added, an obtained liquor is permitted to stand when the liquor becomes transparent, the liquor is pumped into a microfilter to be filtered, filtrate is taken to obtain a finished product, the finished product is subjected to appearance detection and pH value detection and goes into the next procedure if qualified, and the qualified finished product is pumped into a storage tank for later use so as to obtain the botanical disinfectant.

Embodiment 12

A botanical disinfectant comprises the following raw materials: 0.7 g of tea tree essential oil, 0.8 g of niaouli essential oil, 0.7 g of palmarosa essential oil, 0.8 g of lemon mint essential oil, 0.6 g of litsea cubeba essential oil, 0.7 g of azelaic acid, 5.0 g of Tween 80, 25 g of ethanol, 5 g of 1,2-propanediol, 0.04 g of ethylenediaminetetraacetic acid (EDTA) disodium salt and water.

A method for preparing the botanical disinfectant comprises:

(1) 0.7 g of tea tree essential oil, 0.8 g of niaouli essential oil, 0.7 g of palmarosa essential oil, 0.8 g of lemon mint essential oil and 0.6 g of litsea cubeba essential oil are mixed and then uniformly stirred for 20 min to obtain an essential oil mixture, and the essential oil mixture is permitted to stand for later use;

(2) 0.7 g of azelaic acid is mixed with 7.0 g of ethanol to be dissolved to prepare an ethanolic solution of azelaic acid, and the ethanolic solution of azelaic acid is permitted to stand for later use;

(3) 5.0 g of Tween 80 is mixed with 5 g of 1,2-propanediol to obtain an auxiliary agent;

(4) the essential oil mixture is mixed with the auxiliary agent, and stirring is performed for 20 min to obtain a first mixture;

(5) 18.0 g of remaining ethanol is mixed with the first mixture in a manner that stirring is performed during adding of ethanol until all the ethanol is added to obtain a second mixture;

(6) the ethanolic solution of azelaic acid is mixed with the second mixture, and stirring is performed for 20 min to obtain a third mixture; and (7) water slowly added into the third mixture, then 0.04 g of EDTA disodium salt is added, stirring is performed for 20 min, an obtained liquor is permitted to stand, the liquor pumped into a microfilter to be filtered, and filtrate is taken to obtain a finished product, the finished product is subjected to appearance detection and pH value detection and goes into the next procedure is qualified, and the qualified finished product is pumped into a storage tank for later use so as to obtain the botanical disinfectant.

COMPARATIVE EXAMPLE 1

A botanical disinfection composition comprises the following raw materials: 0.5 g of tea tree essential oil, 1.0 g of niaouli essential oil, 0.5 g of angelica essential oil, 1.0 g of honeysuckle essential oil and 0.3 g of lemon myrtle essential oil.

A method for preparing the disinfection composition comprises: 0.5 g of tea tree essential oil, 1.0 g of niaouli essential oil, 0.5 g of angelica essential oil, 1.0 g of honeysuckle essential oil and 0.3 g of the lemon myrtle essential oil are uniformly mixed.

COMPARATIVE EXAMPLE 2

A botanical disinfection composition comprises the following raw materials: 0.5 g of tea tree essential oil, 1.0 g of bay essential oil, 0.5 g of palmarosa essential oil, 1.0 g of walnut leaf essential oil and 0.3 g of litsea cubeba essential oil.

A method for preparing the disinfection composition comprises: 0.5 g of tea tree essential oil, 1.0 g of bay essential oil, 0.5 g of palmarosa essential oil, 1.0 g of walnut leaf essential oil and 0.3 g of the litsea cubeba essential oil are uniformly mixed.

COMPARATIVE EXAMPLE 3

Tianjing Brand pure botanical disinfectant produced by Beijing Purui Huakang Biotechnology Co., Ltd. is taken as the comparative example 3.

EXPERIMENTAL EXAMPLE

The botanical disinfection compositions in the embodiments 1, 3, 5 and 7 and in the comparative examples 1-3 are applied to act on fifth-generation *Staphylococcus aureus* (ATCC6538), fifth-generation *Escherichia coli* (8099), fifth-generation *Candida albicans* (ATCC10231), fifth-generation *Pseudomonas aeruginosa* (ATCC15442) and fourth-generation *Mycobacterium chelonei* subsp. *abscessus* (ATCC93326), and action times and average killing effects are shown in the table 1 below.

TABLE 1

Comparative results of action times and average killing effects of botanical disinfection compositions in embodiments 1, 3, 5 and 7 and comparative examples 1-3 on different test organisms

| Serial No. | Experimental example | Test organisms | Action time (min) | Average killing effect (%) |
|---|---|---|---|---|
| 1 | Embodiment 1 | fifth-generation | 30 | >99.998 |
|  | Embodiment 3 | *staphylococcus aureus* | 28 | >99.999 |
|  | Embodiment 5 | (ATCC6538) | 1.5 | >99.998 |
|  | Embodiment 7 |  | 1 | >99.999 |
|  | Comparative example 1 |  | 35 | 99.8 |
|  | Comparative example 2 |  | 35 | 99.7 |
|  | Comparative example 3 |  | 1 | 99.91 |
| 2. | Embodiment 1 | fifth-generation | 30 | >99.997 |
|  | Embodiment 3 | *escherichia coli* (8099) | 27 | >99.999 |
|  | Embodiment 5 |  | 1 | >99.997 |
|  | Embodiment 7 |  | 0.5 | >99.999 |

TABLE 1-continued

Comparative results of action times and average killing effects of
botanical disinfection compositions in embodiments 1, 3, 5 and 7
and comparative examples 1-3 on different test organisms

| Serial No. | Experimental example | Test organisms | Action time (min) | Average killing effect (%) |
|---|---|---|---|---|
|  | Comparative example 1 |  | 35 | 99.3 |
|  | Comparative example 2 |  | 35 | 99.4 |
|  | Comparative example 3 |  | 1 | 99.98 |
| 3 | Embodiment 1 | fifth-generation candida albicans (ATCC10231) | 30 | >99.98 |
|  | Embodiment 3 |  | 29 | >99.99 |
|  | Embodiment 5 |  | 2 | >99.97 |
|  | Embodiment 7 |  | 1.5 | >99.99 |
|  | Comparative example 1 |  | 33 | 99.5 |
|  | Comparative example 2 |  | 33 | 99.6 |
|  | Comparative example 3 |  | 1 | 99.94 |
| 4. | Embodiment 1 | fifth-generation *pseudomonas aeruginosa* (ATCC15442) | 30 | >99.997 |
|  | Embodiment 3 |  | 27 | >99.999 |
|  | Embodiment 5 |  | 1 | >99.998 |
|  | Embodiment 7 |  | 0.5 | >99.999 |
|  | Comparative example 1 |  | 35 | 99.8 |
|  | Comparative example 2 |  | 35 | 99.7 |
|  | Comparative example 3 |  | 2 | 99.92 |
| 5 | Embodiment 1 | fourth-generation *mycobacterium chelonei* subsp. *abscessus* (ATCC93326) | 15 | >99.98 |
|  | Embodiment 3 |  | 13 | >99.99 |
|  | Embodiment 5 |  | 1.5 | >99.98 |
|  | Embodiment 7 |  | 1 | >99.99 |
|  | Comparative example 1 |  | 18 | 99.3 |
|  | Comparative example 2 |  | 18 | 99.4 |
|  | Comparative example 3 |  | 3 | 99.94 |

As shown in Table 1, the disinfection compositions of the embodiments 1,3,5 and 7 are obviously better than those of the comparative examples 1-3 in respect of the average killing effects on the test organisms, with all the standard requirements met. After azelaic acid is added, the disinfection action time of the disinfection compositions is obviously shortened.

Chemical synthetic disinfectants such as ethanol, benzalkonium bromide (bromogeramine), 1210 (fourth generation) and iodophor are adopted as comparative examples which are to be compared with the botanical disinfectant prepared according to the embodiment 11 of the present invention in terms of times needed for acting on different test organisms to meet the disinfection requirements. The results are as shown in Table 2 below.

TABLE 2

Comparative results of times needed by the chemical synthetic disinfectants
in comparative examples and the disinfection composition in embodiment 11
to act on different test organisms to meet disinfection requirements

| Serial No. | Experimental example | Concentration | Test organisms | Time needed for meeting disinfection requirements (min) |
|---|---|---|---|---|
| 1. | Ethanol (alcohols) | 70% | *Escherichia coli* | 0.5. |
|  |  |  | *Pseudomonas auerginosa* | 1 |
|  |  |  | *Staphylococcus aureus* | 5 |
|  |  |  | *Mycobacterium tuberculosis* | 5 |
|  |  |  | *Candida albicans* | 1 |
| 2 | Benzalkonium bromide (bromogeramine) (quaternary ammonium salt) | 1:1000 | *Escherichia coli* | 10 |
|  |  |  | *Staphylococcus aureus* | 5 |
| 3 | 1210 (fourth generation) (quaternary ammonium salt) | 250 ppm | *Staphylococcus aureus* | 5 |
|  |  |  | *Escherichia coli* |  |
|  |  | 500 ppm | *Pseudomonas auerginosa* | 5 |
| 4 | Iodophor (halogens) | 10 mg/L | Common pathogenic bacteria | 1 |
|  |  | 40 mg/L | *Candida albicans* | 5 |
|  |  | 1000 mg/L | *Mycobacterium chelonei* subsp. *Abscessus* | 1 |
| 5 | Embodiment 11 | Stock | *Escherichia coli* | 0.5. |
|  |  |  | *Pseudomonas auerginosa* | 0.5. |
|  |  |  | *Staphylococcus aureus* | 1. |

TABLE 2-continued

Comparative results of times needed by the chemical synthetic disinfectants in comparative examples and the disinfection composition in embodiment 11 to act on different test organisms to meet disinfection requirements

| Serial No. | Experimental example | Concentration | Test organisms | Time needed for meeting disinfection requirements (min) |
|---|---|---|---|---|
| | | | Candida albicans | 1.5 |
| | | | Mycobacterium chelonei subsp. Abscessus | 1. |

As shown in Table 2, compared with common chemical synthetic disinfectants in comparative examples, the disinfectant of embodiment 11 has bactericidal effects on various bacteria, needs obviously less time for meeting disinfection requirements, and has notable effects particularly on *Staphylococcus aureus, Pseudomonas aeruginosa* and *Mycobacterium chelonei* subsp. *abscessus*.

In general, the disinfection composition and disinfectant made by the method provided by the invention can effectively kill common bacteria which can cause hospitals infection such as enteropathogenic bacteria, suppurative pathogens and pathogenic yeast, and can effectively kill *Mycobacterium chelonei*. The disinfection composition and disinfectant disclosed by the invention can be widely used for medical sterilization, personal sanitary disinfection and family preventive disinfection.

The above-described embodiments are merely examples for the purpose of clarity and are not intended to limit the embodiments. For one of ordinary skill in the art, other different forms of changes or variations can be made on the basis of the above description. It is unnecessary and impossible to be exhaustive of all implementations. Obvious changes or modifications extended therefrom are still within the protection scope of the invention.

The invention claimed is:

1. A botanical disinfection composition, comprising the following raw materials in parts by weight:
   0.5-1.0 part of tea tree essential oil,
   0.5-1.0 part of niaouli essential oil,
   0.5-1.0 part of palmarosa essential oil,
   0.5-1.0 part of lemon mint essential oil,
   0.3-0.8 part of lemon myrtle essential oil and/or litsea cubeba essential oil,
   3.4-6.4 parts of Tween 80,
   20-30 parts of ethanol,
   4-6 parts of 1,2-propanediol,
   0.03-0.05 part of ethylenediaminetetraacetic acid (EDTA) disodium salt, and
   water.

2. The botanical disinfection composition of claim 1, comprising the following raw materials in parts by weight:
   0.8 part of tea tree essential oil,
   0.5 part of niaouli essential oil,
   0.5 part of palmarosa essential oil,
   0.5 part of lemon mint essential oil,
   0.5 part of lemon myrtle essential oil and/or litsea cubeba essential oil,
   3.5 parts of Tween 80,
   30 parts of ethanol,
   4 parts of 1,2-propanediol,
   0.03 part of EDTA disodium salt, and
   water.

3. The botanical disinfection composition of claim 1, further comprising 0.3-1.0 part of azelaic acid.

4. The botanical disinfection composition of claim 2, further comprising 0.3-1.0 part of azelaic acid.

5. The botanical disinfection composition of claim 3, further comprising 0.5 part of azelaic acid.

6. The botanical disinfection composition of claim 4, further comprising 0.5 part of azelaic acid.

7. A method for preparing the botanical disinfectant of claim 1, comprising:
   (1) uniformly mixing tea tree essential oil, niaouli essential oil, palmarosa essential oil, lemon mint essential oil, and lemon myrtle essential oil and/or litsea cubeba essential oil according to predetermined parts by weight to obtain an essential oil mixture;
   (2) mixing azelaic acid with ethanol in a weight ratio of 1:(5-15) to prepare an ethanolic solution of azelaic acid;
   (3) mixing Tween 80 with 1,2-propanediol to obtain an auxiliary agent;
   (4) mixing the essential oil mixture with the auxiliary agent to obtain a first mixture; and
   (5) adding water into the first mixture and then adding EDTA disodium salt to prepare a second mixture; mixing the ethanolic solution of azelaic acid with the second mixture to obtain a third mixture; and mixing the remaining ethanol with the third mixture to prepare the botanical disinfectant;
   or mixing the remaining ethanol with the first mixture to obtain a second mixture; mixing the ethanolic solution of azelaic acid with the second mixture to obtain a third mixture; and adding water into the third mixture and then adding EDTA disodium salt to prepare the botanical disinfectant.

* * * * *